Patented Mar. 24, 1953

2,632,750

UNITED STATES PATENT OFFICE 2,632,750

SOLUTIONS OF ACRYLONITRILE POLYMERS CONTAINING AN ALKALI OR ALKALINE EARTH METAL SALT

John L. Justice, Chester, Pa., assignor, by mesne assignments, to The Chemstrand Corporation, Decatur, Ala., a corporation of Delaware No Drawing. Application September 7, 1950, Serial No. 183,682

15 Claims. (Cl. 260—32.6)

This invention relates to improved solutions of a fiber forming polymeric material comprising an acrylonitrile polymer.

The solutions normally obtained by intimately mixing at least 5 percent of an acrylonitrile polymer containing at least 80 per cent of acrylonitrile by weight in the molecule, or of a blend comprising such an acrylonitrile polymer, in the known organic solvents for the polymers, are characterized by undesirably high viscosity and are less fluid and mobile than is required for spinning the solutions into fibers at high spinning speeds. For example, in spinning the solutions normally obtained by mixing the acrylonitrile polymer or blend with an organic solvent therefor, by a continuous wet-spinning process in which the solution is extruded into the bath, the fibers are withdrawn over a godet, forwarded directly to a washing drum or the like, thence over a drying device and through a heat-stretching tube to a second godet, and finally to a collecting means, the speed at which the fibers can be withdrawn from the bath and passed over the rotating godets and drums is limited by the high viscosity of the solutions.

The objectionably high viscosity of the solution is particularly noticeable and troublesome in the case of those solutions obtained by intimately mixing 5 percent or more of a blend comprising a fiber-forming acrylonitrile polymer containing at least 80 percent of acrylonitrile with an organic solvent such as N,N-dimethylformamide, N,N-dimethylacetamide, sulfolane, etc. For example, the viscosity of a solution of a substantially homogeneous copolymer of 98 percent acrylonitrile and 2 percent vinyl acetate in dimethylacetamide is too high for rapid spinning, but it is lower than the viscosity of a solution of a blend of such a copolymer of 98 percent acrylonitrile and 2 percent vinyl acetate with a substantially homogeneous copolymer of from 30 to 90 percent of a vinyl-substituted tertiary heterocyclic amine and from 10 to 70 percent of acrylonitrile, the total polymer concentration of the solutions being equal.

The principal object of this invention is to provide organic solvent solutions of the acrylonitrile polymers which are characterized by relatively low viscosity and increased fluidity or mobility as compared to the viscosity and mobility of the solutions normally obtained by intimately mixing a fiber-forming acrylonitrile polymer containing at least 80 percent of acrylonitrile with an organic solvent therefor. Another object is to provide solutions of the polymers which can be spun into fibers at high spinning speeds.

These and other objects are achieved, in accordance with the invention, by intimately mixing the acrylonitrile polymer or polymer blend with the selected organic solvent and a minor proportion of an alkali or alkaline earth metal salt selected from the group consisting of sodium thiocyanate, lithium bromide, calcium chloride, and magnesium bromide.

The alkali or alkaline earth metal salts mentioned appreciably lower the viscosity and increase the fluidity of the polymer solutions, which in turn permits the steps of washing, drying, and heat-stretching the fibers to be performed continuously at high speed. The modification of the viscosity of the solutions appears to be a purely physical (colloid) phenomenon and is obtained regardless of the organic solvent used, and independently of any modification of the color of the solution, and whether the solvent is one which liberates an amine on heating or not.

The salt selected may be used to lower the viscosity of solutions of the polymers in dimethylformamide or dimethylacetamide, but the invention is not limited thereto. The salts may be used to lower the viscosity and increase the fluidity of a solution of the polymer or polymer blend in any solvent which dissolves the polymer or blend, to produce solutions of from 5 to 30 percent concentration, and which is also a solvent for the alkali or alkaline earth metal salt. Examples of suitable solvents in addition to dimethylformamide and dimethylacetamide are sulfolane and nitromethane.

The amount of the specified salt used to modify the solution viscosity may vary. Preferably, the salt is used in an amount of from 0.1 to 5 percent based on the weight of the organic solvent.

In a preferred embodiment of the invention, the solutions are prepared by dissolving the alkali or alkaline earth metal salt in the organic solvent, and then dispersing the polymeric material in finely divided condition in the solution, at room temperature, with rapid stirring, followed by heating to complete the dissolution of the polymer.

The polymeric material may be an acrylonitrile polymer containing at least 80 percent of acrylonitrile in the molecule, including copolymers containing in addition to the acrylonitrile, up to 20 percent of another $>C=C<$ -containing substance which is copolymerizable with acrylonitrile. For example, in addition to polyacrylonitrile, the polymer may be a copolymer of acrylonitrile with one or more of the following substances: acids such as acrylic, haloacrylic, and methacrylic acids; esters such as methyl methacrylate, butyl, octyl, methoxymethyl, and chlorethyl methacrylates and the corresponding esters of acrylic and α-chloracrylic acids; methacrylonitrile; vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinylimides such as N-vinylphthalimide and N-vinyl succinimides; N-vinylcaprolactam and N-vinylbutyrolactam; vinyl aryl compounds such as styrene and vinyl naphthalene vinyl-substituted tertiary heterocyclic amines, such as the various isomeric vinylpyridines, e. g., 2-vinylpyridine, the various isomeric vinylpyrazines; allyl and vinyl amides in which the nitrogen atom is directly attached to the allyl or vinyl radical, such as N-allyl-formamide, N-methallylformamide, N-ethallylformamide, allyl urea, N-allyl sulfonamides, N-vinyl-N-methylformamide, etc. Or the polymeric material may be a blend of a base polymer containing in the molecule at least 80 percent by weight of acrylonitrile with from 2 to not more than 50 percent on the weight of the blend of a modifying polymeric material. Various polymeric materials may be blended with the base polymer to modify it in various respects. Suitable modifying polymeric materials are those which are soluble in dimethylacetamide and which, when mixed with the base polymer in an amount of from 2 to 50 percent of the blend, result in a blend which forms a solution of at least 5 percent concentration in dimethylacetamide, which solution can be formed into fibers by conventional processes. For example, a base acrylonitrile polymer which is not dye-receptive, such as a copolymer of 95 to 99 percent acrylonitrile and 1 to 5 percent of vinyl acetate may be blended with a dye-receptive polymer, such as a copolymer of from 30 to 90 percent of a vinyl-substituted heterocyclic tertiary amine and from 10 to 70 percent of acrylonitrile, to produce a dye-receptive blend. Or a copolymer containing at least 80 percent acrylonitrile may be blended with a copolymer containing from 85 to 99 percent acrylonitrile and from 1 to 15 percent of vinyl chloride. These blends can be mixed with an organic solvent, such as dimethylacetamide, and the resulting mixture can be spun into filaments. However, the viscosity of a solution of a blend of two acrylonitrile polymers is higher than is indicated by the viscosities of solutions of the individual polymers and the mixture or solution comprising the blend is so viscous that it cannot be spun into filaments at high spinning speeds. In accordance with this invention, the viscosity of the mixture of dimethylacetamide and polymer blend is markedly lowered by the inclusion of an alkali or alkaline earth metal salt as disclosed herein. The final composition comprising the polymer, the solvent, and the alkali or alkaline earth metal salt is a highly fluid, clear, mobile solution which, unlike the composition obtained without the use of the salt, does not contain suspended, undissolved gel particles.

The solutions are stable with respect to their viscosity and show no tendency to increase in viscosity on standing for long periods of time.

Further details of the practice of the invention are set forth in the following examples, in which the parts are by weight.

The viscosity values given in the examples were measured at 50° C. by the falling ball method using stainless steel balls one-quarter inch in diameter. The viscosity was calculated from the time of fall, using Bacon's modification of the Faxen equation (Bacon, J. Franklin Inst. 221, 251, 1936).

*Example I*

An 8.8 percent solution of polyacrylonitrile in dimethylformamide was prepared. The solution had a viscosity of 209 poises at 50° C.

To this solution there were added 2.2 gms. of calcium chloride for each 220 gms. of solution, and the mixture was warmed, with stirring, until the calcium chloride had dissolved. This solution had a viscosity of 63 poises at 50° C.

*Example II*

Fifty-four parts of polyacrylonitrile were dissolved in 246 parts of dimethylformamide to obtain an 18 percent solution of the polymer. The solution had a viscosity of 68 poises at 50° C.

2.2 gms. of calcium chloride per each 220 gms. of the solution were added, and the mixture was warmed, with stirring, to dissolve the calcium chloride. The final solution had a viscosity of 36 poises at 50° C.

*Example III*

Fifty-four parts of polyacrylonitrile were dissolved in 246 parts of dimethylacetamide to obtain an 18 percent solution. The solution had a viscosity of 40 poises at 50° C.

To this solution there were added, for each 220 gms. of solution, 3 gms. of calcium chloride and 0.3 cc. of concentrated hydrochloric acid. The viscosity of the final solution was 14 poises at 50° C.

*Example IV*

Fifty-four parts of a copolymer containing, in the molecule, 97 percent acrylonitrile and 3 percent vinyl acetate were dissolved in 246 parts of dimethylformamide, and 3 gms. of calcium chloride per 300 gms. of the solution were added. The mixture was warmed, with stirring, to dissolve the salt. The final solution had a viscosity of 148 poises at 50° C. This compared to a viscosity of 233 poises at 50° C. for a solution consisting of the copolymer and dimethylformamide.

*Example V*

Fifty-four parts of a copolymer containing, in the molecule, 97 percent acrylonitrile and 3 percent vinyl acetate were dissolved in 246 parts of dimethylacetamide, and 3 gms. of calcium chloride per each 300 gms. of solution were added and dissolved. The viscosity of the solution was 125 poises at 50° C. This compared with a viscosity of 388 poises at 50° C. for a solution consisting of the copolymer and dimethylacetamide.

*Example VI*

One part of lithium bromide was dissolved in dimethylacetamide and sufficient amounts of a copolymer containing 97 percent acrylonitrile and 3 percent of vinyl acetate, and of a copolymer containing 50 percent of acrylonitrile and 50 percent of 2-vinylpyridine were added at room temperature to produce a 16.9 solution of a polymer blend having an overall 2-vinylpyridine content of 5 percent. The mixture was heated to 90–100° C. for a one-hour period and mixing was continued for 45 minutes at 90–100° C. The solution was prefiltered through gamgee and allowed to stand for about 2 hours at room temperature. The final solution had a viscosity of 136 poises at 50° C. (ball fall, one-quarter inch balls, at 50° C. 13.9 seconds). It was pumped at the rate of 17.6 cc./min. through a spinneret having 40 holes, each 0.004 inch in diameter, into a mixture of water and dimethylacetamide containing 60 percent by volume of dimethylacetamide, at 50° C. After an immersion of 18 inches, the filaments were withdrawn over a godet (first godet) operating at a peripheral linear velocity of 40 ft./min., passed over a drum operating at a peripheral linear velocity of 100 ft./min. and washed on the drum. The fibers were stretched 150 percent between the first godet and the washing drum. They were then passed over a drying drum on which they were subjected to steam at 1 lb. pressure, and thence to a second godet through a tube in which they were subjected to steam at 40 lb. pressure. The second godet was rotated at a peripheral linear speed of 889 ft./min., the fibers being stretched between the drying drum and the second godet. This compared to a permissible maximum peripheral linear speed of 678 ft./min. for the second godet for control fibers formed from a 16.9 percent solution of the blend, and which did not contain the lithium bromide or other additive. The fibers formed from the solution containing the lithium bromide had a tenacity (dry) of 4.3 gms./denier.

Using steam at 50 lbs. pressure in the heat-stretching tube, the peripheral linear speed of the second godet could be increased to 1078 ft./min to obtain fibers having a tenacity of 4.5 gms./denier. Using steam at 60 lbs. pressure, the speed of the second godet could be increased to 1213 ft./min. to obtain fibers having a tenacity of 4.5 gms./denier.

*Example VII*

An 18 percent dimethylacetamide solution of a blend of a base copolymer containing, by weight in the molecule, 97 percent of acrylonitrile and 3 percent of vinyl acetate, and a modifying copolymer containing 50 percent 2-vinylpyridine and 50 percent of acrylonitrile was prepared. Overall 2-vinylpyridine content of the blend: 5 percent. For each 300 gms. of solution there were added 5.0 gms. of sodium thiocyanate, the mixture being heated, with stirring, until the salt was dissolved. The solution had a viscosity of 97 poises, at 50° C. This compared to a viscosity of 117 poises at 50° C. for a solution consisting of the blend and dimethylacetamide.

*Example VIII*

Copolymers as in Example VII were blended in dimethylacetamide to obtain an 18 percent solution of the blend having a viscosity of 117 poises at 50° C. Three gms. of lithium bromide per each 300 gms. of solution were added and dissolved. The final solution had a viscosity of 49 poises at 50° C.

*Example IX*

For each 300 gms. of a solution consisting of the blended copolymers of Example VII and dimethylacetamide there were added to and dissolved in the solution 5.0 gms. of lithium bromide. The final solution had a viscosity of 33 poises at 50° C.

It will be apparent from the foregoing description that, by the practice of the present invention, it is possible to lower the objectionably high viscosity of acrylonitrile polymer solutions and increase the spinning speed without sacrifice in the properties of the fibers obtained.

In addition to fibers, the compositions of the invention can be formed into other shaped articles such as films, sheets, casings, tubings, rods, etc.

The invention is defined by the appended claims.

I claim:

1. A new composition of matter adapted to be formed into shaped articles, comprising, at least 5 percent of an acrylonitrile polymer containing, by weight in the polymer molecule, at least 80 percent of acrylonitrile, an organic solvent for the polymer, and from 0.1 to 5.0 percent based on the weight of the organic solvent of a substance selected from alkali and alkaline earth metal salts selected from the group consisting of calcium chloride, lithium bromide, sodium thiocyanate, and magnesium bromide.

2. A composition as in claim 1, wherein the polymer is an acrylonitrile copolymer containing, by weight in the molecule, at least 80 percent of acrylonitrile and at least 1 percent of another >C=C<-containing substance which is copolymerizable with acrylonitrile.

3. A composition as in claim 1, wherein the polymer comprises a blend of a base polymer containing, by weight in the molecule, at least 80 percent of acrylonitrile with from 2 to 50 percent on the weight of the blend of a copolymer containing from 30 to 90 percent of a vinyl-substituted tertiary heterocyclic amine and from 10 to 70 percent of acrylonitrile.

4. A composition as in claim 1, wherein the polymer comprises a blend of a base copolymer containing, by weight in the molecule, from 95 to 99 percent of acrylonitrile and from 1 to 5 percent of vinyl acetate, with from 2 to 5 percent on the weight of the blend of a copolymer containing from 30 to 90 percent of 2-vinylpyridine and from 10 to 70 percent of acrylonitrile.

5. A composition as in claim 1, wherein the salt is calcium chloride.

6. A composition as in claim 1, wherein the salt is lithium bromide.

7. A composition as in claim 1, wherein the salt is sodium thiocyanate.

8. A composition as in claim 1, wherein the salt is magnesium bromide.

9. A composition as in claim 1, wherein the organic solvent for the polymer is dimethylacetamide.

10. A composition as in claim 1, wherein the organic solvent for the polymer is dimethylformamide.

11. As a new composition of matter adapted to be formed into shaped articles, at least 5 percent of an acrylonitrile polymer containing, by weight in the molecule, from 95 to 99 percent of acrylonitrile and from 1 to 5 percent of vinyl acetate, dimethylacetamide, and from 0.1 to 5.0 percent on the weight of the dimethylacetamide of calcium chloride.

12. As a new composition of matter adapted to be formed into shaped articles, at least 5 percent of an acrylonitrile polymer containing, by weight in the molecule, from 95 to 99 percent of acrylonitrile and from 1 to 5 percent of vinyl acetate, dimethylformamide, and from 0.1 to 5.0 percent on the weight of the dimethylformamide, of calcium chloride.

13. As a new composition of matter adapted to be formed into shaped articles, at least 5 percent of a blend of a base polymer containing, by weight in the molecule, from 95 to 99 percent of acrylonitrile and from 1 to 5 percent of vinyl acetate with from 2 to 50 percent on the weight of the blend of a copolymer containing, by weight in the molecule, from 30 to 90 percent of a vinyl-substituted tertiary heterocyclic amine and from 10 to 70 percent of acrylonitrile, dimethylacetamide, and from 0.1 to 5 percent on the weight of the dimethylacetamide, of lithium bromide.

14. As a new composition of matter adapted to be formed into shaped articles, at least 5 percent of a blend of a base polymer containing, by weight in the molecule, from 95 to 99 percent of acrylonitrile and from 1 to 5 percent of vinyl acetate, with from 2 to 50 percent of a copolymer containing, by weight in the molecule, about 50 percent of acrylonitrile and about 50 percent of 2-vinylpyridine, dimethylacetamide, and from 0.1 to 5.0 percent on the weight of the dimethylacetamide of lithium bromide.

15. A composition as in claim 1, wherein the polymer is polyacrylonitrile.

JOHN L. JUSTICE.

REFERENCES CITED

The following references are of record in the file of this patent:

UNITED STATES PATENTS

| Number | Name | Date |
|--------|------|------|
| 2,451,420 | Watkins | Oct. 12, 1948 |